US011238309B2

(12) United States Patent
Mandal et al.

(10) Patent No.: US 11,238,309 B2
(45) Date of Patent: Feb. 1, 2022

(54) SELECTING KEYPOINTS IN IMAGES USING DESCRIPTOR SCORES

(71) Applicant: INTEL CORPORATION, Santa Clara, CA (US)

(72) Inventors: Dipan Kumar Mandal, Bangalore (IN); Gurpreet Kalsi, Bangalore (IN); Om J Omer, Bangalore (IN); Prashant Laddha, Santa Clara (CA); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 242 days.

(21) Appl. No.: 16/232,778

(22) Filed: Dec. 26, 2018

(65) Prior Publication Data

US 2019/0171909 A1  Jun. 6, 2019

(51) Int. Cl.
*G06K 9/62* (2006.01)
*G06T 7/246* (2017.01)
*G06K 9/38* (2006.01)
*G06K 9/46* (2006.01)
*G06T 7/579* (2017.01)

(52) U.S. Cl.
CPC ............ *G06K 9/6228* (2013.01); *G06K 9/38* (2013.01); *G06K 9/4604* (2013.01); *G06K 9/4647* (2013.01); *G06K 9/6202* (2013.01); *G06T 7/246* (2017.01); *G06T 7/579* (2017.01); *G06T 2207/20164* (2013.01)

(58) Field of Classification Search
CPC ..................... G06T 7/579; G06T 7/246; G06T 2207/20164; G06K 9/38; G06K 9/4604; G06K 9/4647; G06K 9/6202; G06K 9/6228
See application file for complete search history.

(56) References Cited

U.S. PATENT DOCUMENTS

| 8,406,483 | B2 * | 3/2013 | Zhang | G06K 9/4671 |
| | | | | 382/118 |
| 10,110,846 | B2 * | 10/2018 | Chen | G06K 9/00744 |
| 2011/0001884 | A1 * | 1/2011 | Iketani | H04N 5/145 |
| | | | | 348/699 |

OTHER PUBLICATIONS

Lowe, David G. "Distinctive image features from scale-invariant keypoints." International journal of computer vision 60.2 (2004): 91-110.*

(Continued)

*Primary Examiner* — Shefali D Goradia
(74) *Attorney, Agent, or Firm* — Hanley, Flight & Zimmerman, LLC

(57) ABSTRACT

An example apparatus for selecting keypoints in image includes a keypoint detector to detect keypoints in a plurality of received images. The apparatus also includes a score calculator to calculate a keypoint score for each of the detected keypoints based on a descriptor score indicating descriptor invariance. The apparatus includes a keypoint selector to select keypoints based on the calculated keypoint scores. The apparatus also further includes a descriptor calculator to calculate descriptors for each of the selected keypoints. The apparatus also includes a descriptor matcher to match corresponding descriptors between images in the plurality of received images. The apparatus further also includes a feature tracker to track a feature in the plurality of images based on the matched descriptors.

25 Claims, 10 Drawing Sheets

(56) References Cited

OTHER PUBLICATIONS

Timo Ojala, et al. "Multiresolution Gray-Scale and Rotation Invariant Texture Classification with Local Binary Patterns" IEEE, vol. 24, No. 7, Jul. 2002.*
Harris et al., "A Combined Corner and Edge Detector," Alvey Vision Conference, 1988, 6 pages.
Lowe, "Distinctive Image Features from Scale-Invariant Keypoints," International Journal of Computer Vision, 2004, 28 pages.
Rosten et al., "Machine Learning for High-Speed Corner Detection," Proceedings of the European Conference on Computer Vision, 2006, 14 pages.
Bay et al., "SURF: Speeded up Robust Features," Proceedings of the European Conference on Computer Vision, 2006, 14 pages.
Rublee et al., "ORB: An Efficient Alternative to SIFT or SURF," Proceedings of the European Conference on Computer Vision, 2011, 9 pages.
Calonder et al., "BRIEF: Binary Robust Independent Elementary Features," Proceedings of the European Conference on Computer Vision, 2010, 14 pages.
Leutenegger et al., "BRISK: Binary Robust Invariant Scalable Keypoints," Proceedings of the International Conference on Computer Vision, 2011, 8 pages.
Miksik et al., "Evaluations of Local Detectors and Descriptors for Fast Feature Matching," Proceedings of the 21st International Conference on Pattern Recognition, 2012, 4 pages.
Madeo et al., "Fast, Compact and Discriminative: Evaluation of Binary Descriptors for Mobile Applications," IEEE Transactions on Multimedia, vol. 19, No. 2, 15 pages.
Wu et al., "A Comprehensive Evaluation of Local Detectors and Descriptors," Signal Processing: Image Communication, 2017, 51 pages.
Balntas et al., "HPatches: A Benchmark and Evaluation of Handcrafted and Learned Local Descriptors," 2017, 10 pages.
Open Source Computer Vision Library, 2 pages. Retrieved Sep. 8, 2021, from https://github.com/opencv/opencv.
Jones et al., "Visual-Inertial Navigation, Mapping and Localization: A Scalable Real-Time Causal Approach," Journal of Robotics Research, 2010, 38 pages.

\* cited by examiner

300A

SELECTING KEYPOINTS IN IMAGES USING DESCRIPTOR SCORES

BACKGROUND

Keypoints can be used to establish point-to-point correspondences in images. For example, the point-to-point correspondences may be used by vision algorithms, such as object tracking, Visual Odometry, simultaneous localization and mapping (SLAM), three dimensional (3D) reconstruction, object recognition, image search and retrieval, panorama creation, and virtual view synthesis, among other applications.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
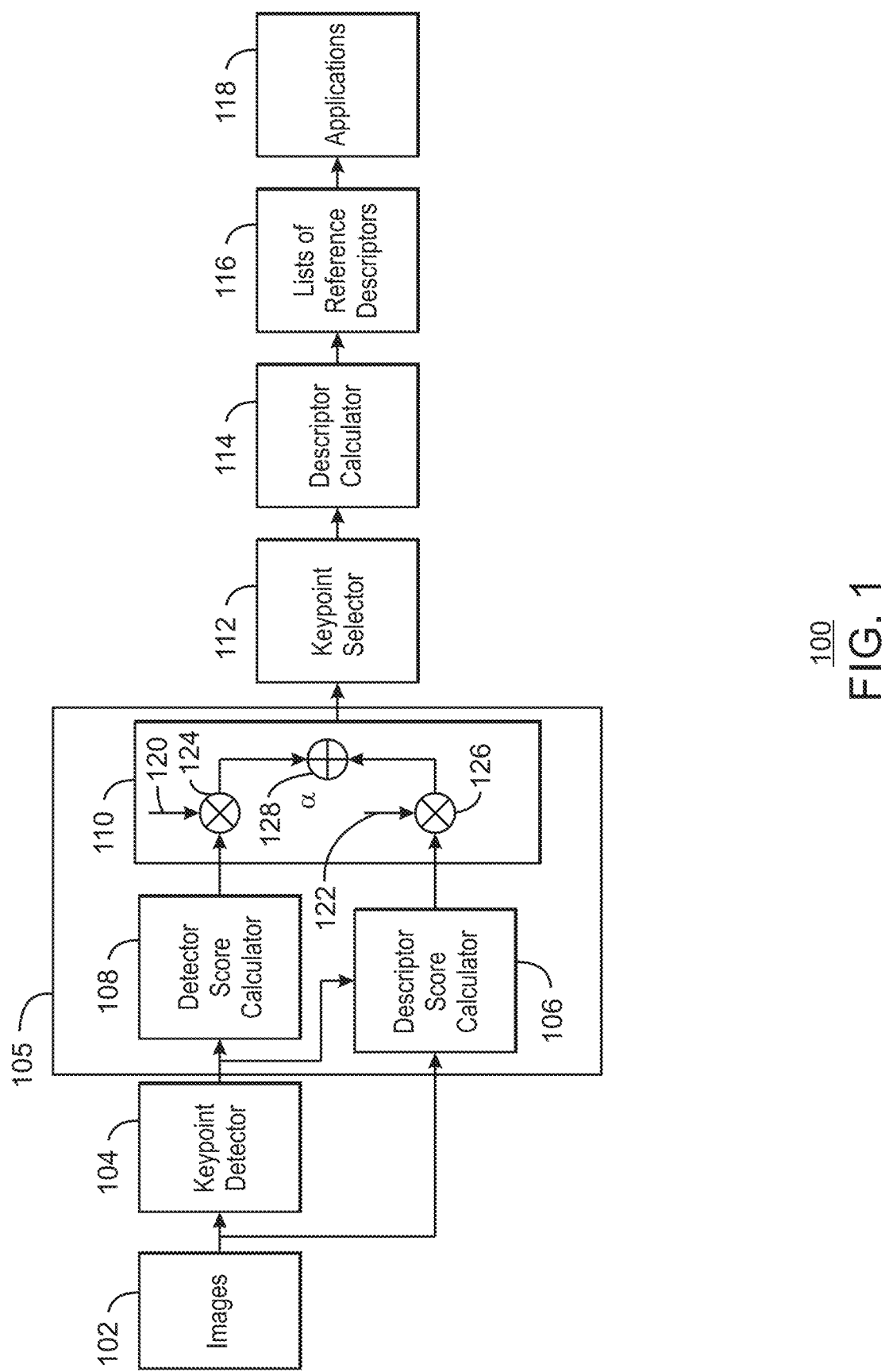
FIG. 1 is a block diagram illustrating an example system for selecting keypoints using descriptor scores.

As discussed above, finding point to point correspondences is used in vision algorithms. Some examples of vision algorithms using point-to-point correspondences discussed herein are object tracking, visual odometry, simultaneous localization and mapping (SLAM), 3D reconstruction, object recognition, image search and retrieval, panorama creation, and virtual view synthesis, etc.

Finding point to point correspondences between images may involve the detection of keypoints, also known as feature points, in images, followed by describing a small area around each key point using a descriptor, and finally finding matches for descriptors in one image among the descriptors from another. As used herein, a keypoint refers to a distinct, salient point in an image that can potentially be used for tracking objects or differences between images. The number of keypoints used in these tasks may be smaller than number of detected keypoints. Therefore, out of the detected keypoints, a smaller subset of keypoints may be selected. However, not every keypoint may not be equally good or reliable. Moreover, keypoint correspondences obtained using feature matching of unreliable keypoints may be input to higher level vision tasks. Thus, these vision tasks may not work correctly. In particular, the feature matching results are not guaranteed to be correct for every detected keypoint because the feature detection and description may not accurately process every possible geometric and photometric distortion. The percentage of correct feature matches can vary based on choice of detector or descriptor, as well as content. As used herein, a descriptor is a vector of values that describes an image patch around a keypoint. For example, the vector of values in the descriptor may describe elementary characteristics of a keypoint, such as shape, color, texture, etc. A keypoint with a respective descriptor is referred to herein as a feature. In some instances, tracking algorithms may be system estimators relying on keypoint matches as input. For these estimator to work well, a good percentage of keypoint matches may be correct. If keypoints for which feature matching can fail are selected, then higher level algorithmic blocks can fail because of the incorrect inputs.

As one example, a detector algorithm selects N keypoints out of the detected keypoints in a given image and the physical locations of N points may also visible in subsequent images. By using feature matching, the detector can attempt to find correct matches for the N keypoints from the given image into the next image. However, in practice, due to geometric and photometric distortions, correct matches may not be found for some of the detected keypoints. Some examples of geometric distortions are zoom, rotation, perspective changes, lens distortions, etc. Some examples of photometric distortions are changes in illumination, exposure, noise, motion blur, etc. Thus, only a fraction of N keypoints with correct matches, may be able to provide valid input for tracking.

Existing methods may thus choose strong corners, but not necessarily strong descriptors. As used herein, strength of a corner or descriptor refers to the invariance of a corner or descriptor to various image distortions. While selecting keypoints, existing methods may not factor in how invariant and discriminative a descriptor is. For example, a corner score can indicate if the corner is likely to be remain as corner even under image distortions or not. However, the corner score does not indicate whether the descriptor is going to remain unchanged with the image distortions. Selection based on detector score thus may provide a high repeatability of detection, but may not produce a high matching rate. For example, if a strong corner is detected as keypoint in a frame, then it is quite likely to be detected again in next frame as well. However, detection alone does not guarantee a match. If the descriptor of that point has changed for some reason, the feature matching will fail. Existing methods of keypoint selection therefore may not adequately factor in the requirements of higher level vision tasks.

The present disclosure relates generally to techniques for selecting keypoints using descriptor scores. Specifically, the techniques described herein include an apparatus, method and system for selecting keypoints using descriptor scores. The descriptor scores may be used to indicate the strength of descriptor to remain invariant under image distortions. The techniques described herein also include method to calculate descriptor score for binary descriptors using sum of absolute differences of pixels in pairs used in descriptor formation. The techniques described herein also include calculation of a keypoint score using a weighted combination of a detector score and a descriptor score. The keypoint score calculator also provides a mechanism to incorporate multiple selection criteria. For example, additional selection criteria can be included by calculating additional scores and calculating the keypoint score based on the additional scores. The additional selection criteria may be based on specific higher level vision tasks. In addition, the techniques described herein may be used to determine strong, repeatable keypoints that are detected in every image based on calculated invariant descriptors which remain relatively unchanged under image distortions.

The techniques described herein thus enable selection of keypoints whose descriptors are strong enough to remain unchanged under image distortions. Such keypoints are more likely to enable correct feature matches. From experiments performed to validate these techniques, it was found that descriptor score based keypoint selection provides very significant improvements in correct feature matches. Moreover, the improvement in correct feature matches translates to very significant improvements in the capabilities of end applications. For example, the end applications may include visual odometry and SLAM, among other application discussed herein. The techniques described herein thus enable better selection of keypoints to improve results of higher level vision tasks. The techniques described herein thus enable significant and consistent improvement in correct matches. As confirmed in experiments, the techniques described herein thus enable consistent improvements of 8-10% and up to 15% improvements in percentage of correct feature matches, and up to 40% improvement in loop closure in visual odometry. The techniques described herein also reduce the possibility of false positives. For example, the techniques further enable keypoints with strong, distinct structures are less likely to result in false matches. The techniques described herein further also enable broader adoptability. For example, the proposed techniques can be implemented in hardware, software, or any combination of hardware and software. The techniques described herein thus enable wider applicability. The techniques described herein can work with any existing detector and descriptors. The techniques described herein also further provide a computationally efficient method for descriptor score calculation.

FIG. 1 is a block diagram illustrating an example system for selecting keypoints using descriptor scores. The example system is referred to generally by the reference number 100 and can be implemented in the computing device 600 in FIG. 6 using the methods 400 and 500 of FIGS. 4 and 5.

The example system 100 includes images 102 being received at a keypoint detector 104 and a score calculator 105. The score calculator 105 is communicatively coupled to the keypoint detector 104. The score calculator 105 includes a descriptor score calculator 106, a descriptor score calculator 108, and a keypoint score calculator 110 communicatively coupled to the descriptor score calculator 106 and the descriptor score calculator 108. The system 100 further includes a keypoint selector 112 communicatively coupled to the keypoint score calculator 110. The system 100 also further includes a descriptor calculator 114 communicatively coupled to the keypoint selector 112. The descriptor calculator 114 outputs a list of reference descriptors 116. The system 100 also further includes a number of applications 118 communicatively coupled to the descriptor calculator 114.

As shown in FIG. 1, the system 100 can generate a list of reference descriptors 116 for use by applications 118 for each of the received images 102. For example, given an image 102 the keypoint detector 104 can detect keypoints in the image. In various examples, keypoints are distinct, salient points in an image. In some examples, the keypoints are detected corner points or local extrema in an image. In various examples, the keypoint detector 104 is a Harris corner detector, a Hessian detector, a Laplacian of Gaussian (LoG) detector, or a features from accelerated segment test (FAST) detector. For example, a Harris corner uses horizontal and vertical gradients to form hessian matrix whose Eigen values indicate the strength of corner. A LoG detector includes a LoG operator that is a high pass filter. For example, if pixel values change spatially, the LoG operator produces higher output. In some examples, the output extrema of the LoG operator is detected as corner. In various examples, the FAST detector compares every pixel in a ring of 16 pixels with the center pixel. If 9 or more consecutive pixels in ring are either darker or brighter than a center pixel, then the FAST detector detects the center pixel as corner. In some examples, the keypoint detector 104 is a SIFT detector based on difference-of-Gaussians (DoG), which is an approximation of the Laplacian.

The descriptor score calculator 106 calculates a descriptor score for each of the detected keypoints in an image based on the image data. For example, the descriptor score is a measure of geometric or photometric invariance. The descriptor score is used to indicated an invariance of a descriptor of a keypoint under various geometric or photometric distortions. Such distortions may lead to changes in pixel values. If the statistical relations among pixels in a given region remain unchanged under image distortions, then for such region, the descriptors may remain unchanged. The descriptor score can thus be a measure of descriptor strength, where descriptor strength is the ability of the descriptor to remain relatively unchanged under distortions. For a given description method, the descriptor strength may depend upon of strength of structure among the pixels or the relative values of pixels around keypoints. If there are strong, prominent structures around keypoint, then the descriptors will strong enough to survive distortion. Some example of strong structures are distinct edges and high contrast regions. As one example, the descriptor score is calculated using a sum of absolute differences of the pixels from pixels pairs used in formation of binary descriptors.

In various examples, the detector score calculator 108 calculates a detector score for each of the detected keypoints. For example, the detector score can be calculated using a corner score or other similar techniques. A corner score indicates magnitude of gradients around keypoint. For example, corners with sharp edges where intensity gradient is high in both x and y directions have high corner scores and hence considered as strong corners. In some examples, a corner score is based on averaged local gradients in small local neighborhood, typically in 7×7 window. However, while a local gradient can indicate the strength of a corner, the local gradient does not provide much idea about, for example, texture around the corner.

The keypoint score calculator 110 can calculated a keypoint score based on the calculated detector score and descriptor score. For example, weights 120 and 122 may be applied to the detector score and descriptor scores, respectively, to generate weighted detector score 124 and weighted descriptor score 126. The weighted detector score 124 and weighted descriptor score 126 may be combined to generate the keypoint score 128. In various examples, the keypoint score calculator 110 is an extensible mechanism that can incorporate multiple criteria for keypoint selection. For example, additional types of scores and weights can be incorporated into the keypoint score calculator 110 and used to generate keypoint scores.

The keypoint selector 112 selects a predetermined number of keypoints with higher keypoint scores 128 than other keypoints. For example, the number of keypoints to be selected can be based on speed and memory quality, among possible other factors.

The descriptor calculator 114 can calculate a descriptor for each of the selected keypoints. In various examples, the descriptor is a statistical representation of pixel values in a region around the keypoint. In some examples, techniques used for generating descriptors include using a distribution of gradients. For example, the generated descriptors can be histogram of gradients descriptors, such as scale-invariant feature transform (SIFT), speeded up robust features (SURF), and variants thereof. In some examples, descriptor calculator 114 can calculate a descriptor based on relative intensity differences among pixel pairs in an image patch associated with the keypoint. For example, the binary descriptors may include Binary Robust Independent Elementary Features (BRIEF), Binary Robust Invariant Scalable Keypoints (BRISK), Oriented FAST and Rotated BRIEF (ORB) or any variants thereof, can be used to generate the descriptors.

In various examples, the descriptor calculator 114 can generate a list of reference descriptors 116 and send the list to the applications 118. The keypoints along with their descriptors thus serve as sparse, efficient representation of image information. For example, the applications can use the list of reference descriptors in performing tracking or other high level vision tasks. In some examples, the applications can include object tracking, visual odometry, simultaneous localization and mapping (SLAM), 3D reconstruction, object recognition, image search and retrieval, panorama creation, and virtual view synthesis, among other tracking applications. For example, visual odometry is a process of determining the position and orientation of a robot by analyzing associated camera images. In some examples, applications 118 employing keypoint detection, description and matching can be termed as feature-based vision applications. Feature-based vision applications use a set of keypoints to accomplish higher level tasks, such as detection, tracking, classification, structure from motion, etc. The feature-based vision applications may use features instead of pixels from received images because the features may enable significant computational savings since algorithms need to process fewer keypoints than pixels. Features also enable improved accuracy because features capture higher order information about image.

The diagram of FIG. 1 is not intended to indicate that the example system 100 is to include all of the components shown in FIG. 1. Rather, the example system 100 can be implemented using fewer or additional components not illustrated in FIG. 1 (e.g., additional images, keypoints, scores, descriptors, applications, etc.). For example, one or more additional scores can be included with additional corresponding weights in the keypoint score calculator 110.

Figure 2A:
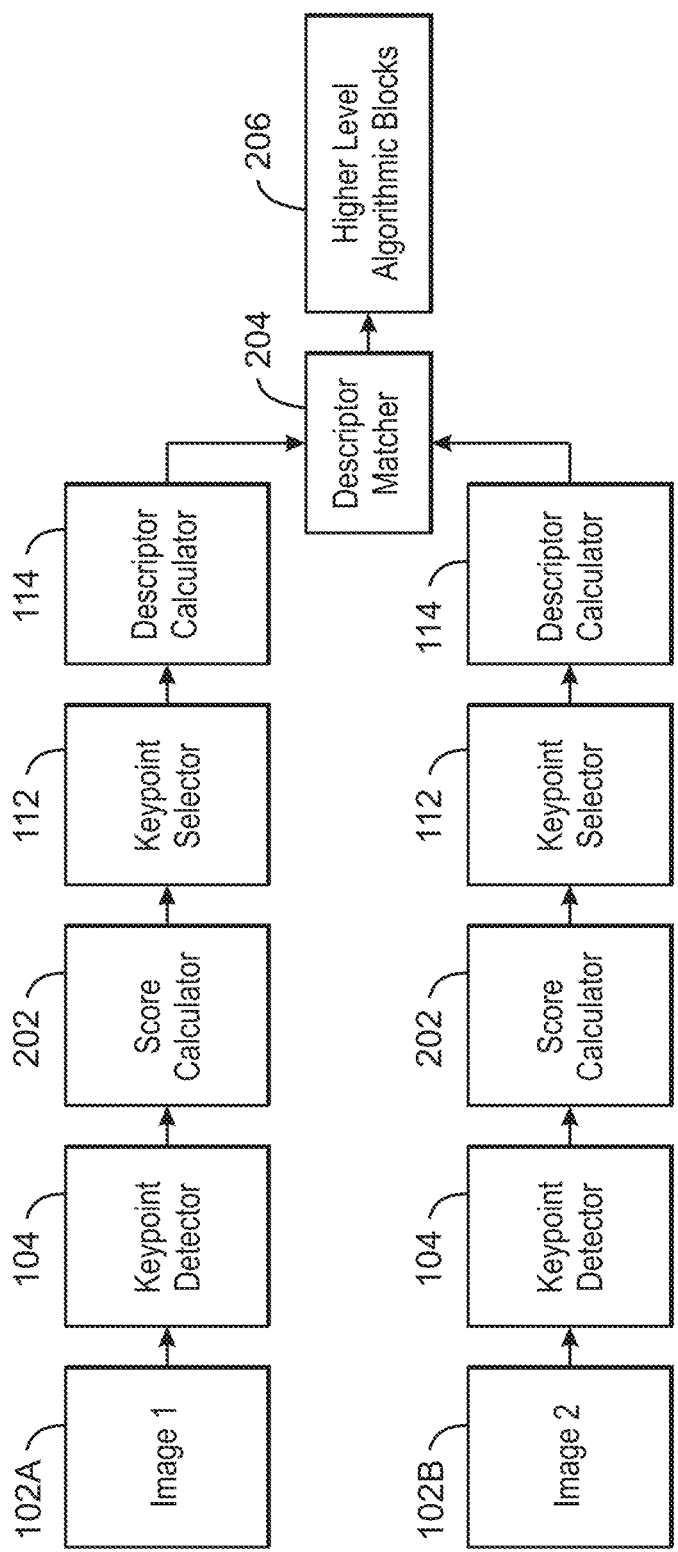
FIG. 2A is a flow chart illustrating an example system for performing matching of keypoints selected using descriptor scores.

FIG. 2A is a diagram illustrating an example system for performing matching of keypoints selected using descriptor scores. The example system 200A can be implemented in the computing device 600. For example, the system 200A can be implemented using the descriptor aware keypoint selector 628 of the computing device 600 of FIG. 6, or the processor 702 of the computer readable media 700 of FIG. 7.

FIG. 2A includes similarly numbered elements from FIG. 1. In particular, FIG. 2A includes two images 102A and 102B received by two keypoint detectors 104. The keypoint detectors 104 are communicatively coupled to two score calculators 202. For example, the score calculators 202 can be the score calculator of FIG. 1, and can include a descriptor score calculator, a detector score calculator, and a keypoint score calculator as described with respect to FIG. 1. The system 200A includes two keypoint selectors 112 communicatively coupled to the score calculators 202. For example, the keypoint selectors 112 can select keypoints based on keypoint scores from the score calculators 202. The keypoint selectors 112 are communicatively coupled to descriptor calculators 114. The descriptor calculators 114 are communicatively coupled to a descriptor matcher 204. The system 200 further includes a set of higher level algorithmic blocks 206 coupled to the descriptor matcher 204. For example, the higher level algorithmic blocks 206 may be part of a tracking application.

In the example system 200A of FIG. 2A, a feature detection, feature description and descriptor matching can be performed to establish point-to-point correspondences in a number of images 102. For example, the keypoint detectors 104 detect a number of keypoints in each of the images 102A and 102B. The score calculator 202 can calculate keypoint score for each of the detected keypoints in each of the images 102A and 102B. For example, the keypoint scores can be based on descriptor scores calculated for each of the keypoints. In some examples, the keypoint scores are based on a descriptor scores and a detector scores calculated for each of the detected keypoints. For example, the score calculator 202 can be implemented using blocks 106, 108 and 110 of FIG. 1.

The keypoint selector 112 selects a subset of keypoints from the number of detected keypoints based on the keypoint scores calculated for the keypoints. For example, keypoint selector 112 can select a subset of the keypoints with calculated keypoint scores exceeding a threshold keypoint score. In some examples, the subset of keypoints is a predetermined number of keypoints.

The descriptor calculator 114 calculates descriptors for each of selected keypoints. For example, a descriptor can describe each keypoint by extracting distinctive information from the region around the keypoint. For example, a descriptor of the keypoint can be based on a histogram of intensity gradients. In some examples, the descriptor of a keypoint is a binary descriptor based on intensity differences between intensity values of pixel pairs inside an image patch centered on the keypoint. In some examples, a set of keypoints in one image 102A are selected, and their descriptors are calculated and stored as a reference list of keypoints and corresponding descriptors.

A descriptor matcher 204 can compare descriptor in image 102A with descriptor from image 102B using some form of vector distance. For example, the vector distance can be the L2 distance for histogram based descriptors or a hamming distance for binary descriptors. The descriptor matcher 204 can detect a match if the distance between two descriptors is sufficiently less than a given difference. For example, the descriptor matcher 204 can detect a match in response to detecting that the vector distance between them is less than a certain threshold. In some examples, a corresponding point in a subsequent image 102B may be found for every point in a reference list for image 102A by using descriptor matching.

The detected matched keypoints can be sent to a higher level algorithmic blocks 206. For example, higher level algorithmic blocks 206 may include detection, tracking, structure from motion, etc. In some examples, the higher level algorithmic blocks 206 estimate camera trajectory by tracking locations of selected keypoints from one image to another. In various examples, the higher level algorithmic blocks 206 can include blocks for tracking an object, performing a visual odometry, performing simultaneous localization and mapping (SLAM), performing a three-dimensional (3D) reconstruction, performing object recognition, performing image search and retrieval, performing panorama creation, or performing virtual view synthesis, etc.

The diagram of FIG. 2A is not intended to indicate that the example system 200A is to include all of the components shown in FIG. 2A. Rather, the example system 200A can be implemented using fewer or additional components not illustrated in FIG. 2A (e.g., additional images, keypoint detectors, keypoint selectors, descriptor calculators, descriptor matchers, higher level algorithmic blocks, etc.).

Figure 2B:
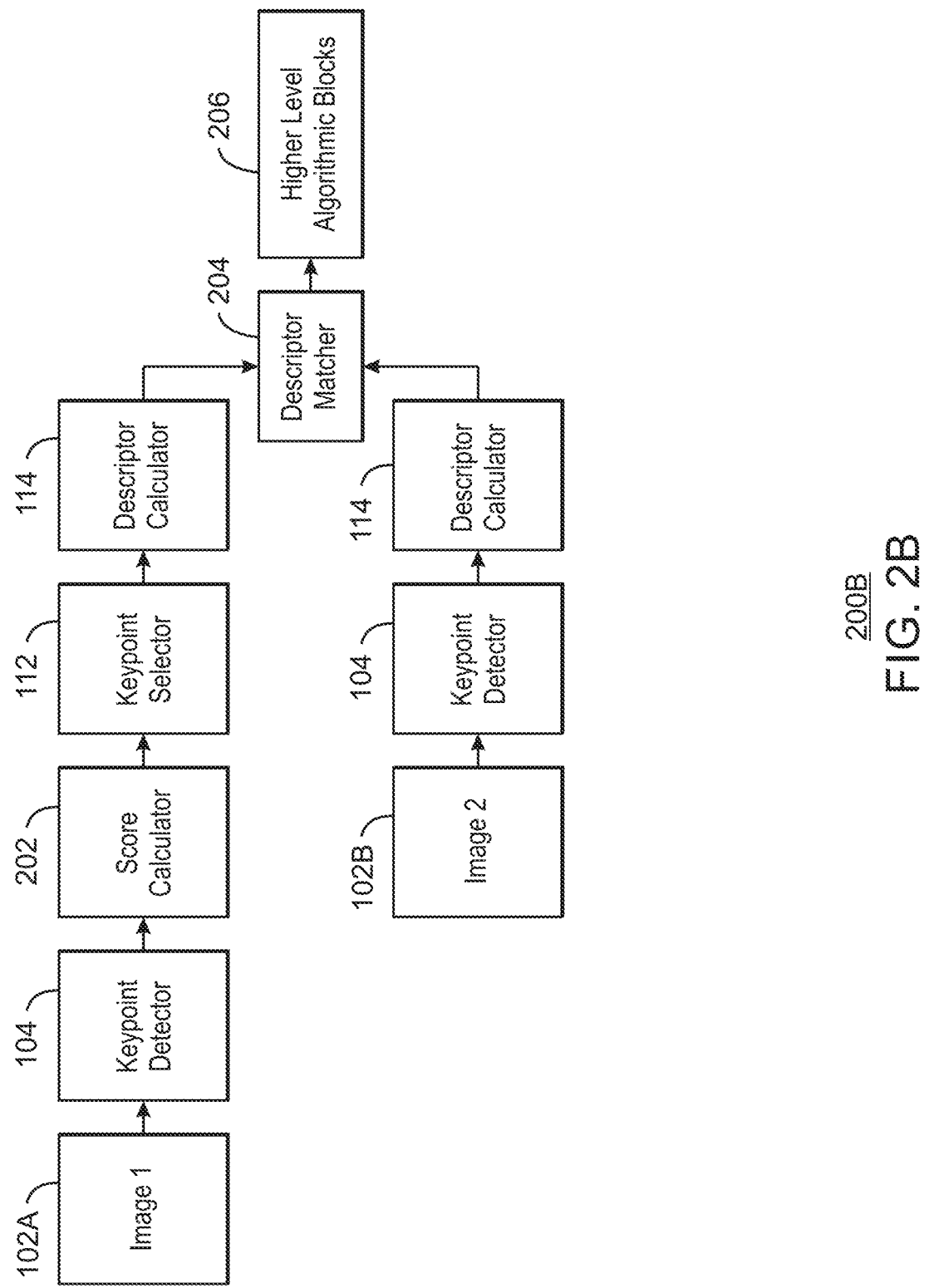
FIG. 2B is a flow chart illustrating another example system for performing matching of keypoints selected using descriptor scores.

FIG. 2B is a flow chart illustrating another example system for performing matching of keypoints selected using descriptor scores. The example system 200A can be implemented in the computing device 600. For example, the system 200A can be implemented using the descriptor aware keypoint selector 528 of the computing device 600 of FIG. 6, or the processor 702 of the computer readable media 700 of FIG. 7.

FIG. 2B includes similarly referenced elements performing similar functionality from FIG. 2A. In FIG. 2B, key point selection is performed by the keypoint selector 112 on image 102A as describe in FIG. 2A. Thus, the second image 102B is sent to a keypoint detector 104 to detect keypoints in the second image 102B. The descriptor calculator 114 can calculate descriptors for the detected keypoints in the second image 102B. The descriptor calculator 114 then sends the calculated descriptors from image 102B to the descriptor matcher 204 to match the descriptors with descriptors calculated for the set of selected keypoints in image 102A.

The diagram of FIG. 2B is not intended to indicate that the example system 200B is to include all of the components shown in FIG. 2B. Rather, the example system 200B can be implemented using fewer or additional components not illustrated in FIG. 2B (e.g., additional images, keypoint detectors, keypoint selectors, descriptor calculators, descriptor matchers, higher level algorithmic blocks, etc.).

Figure 3A:
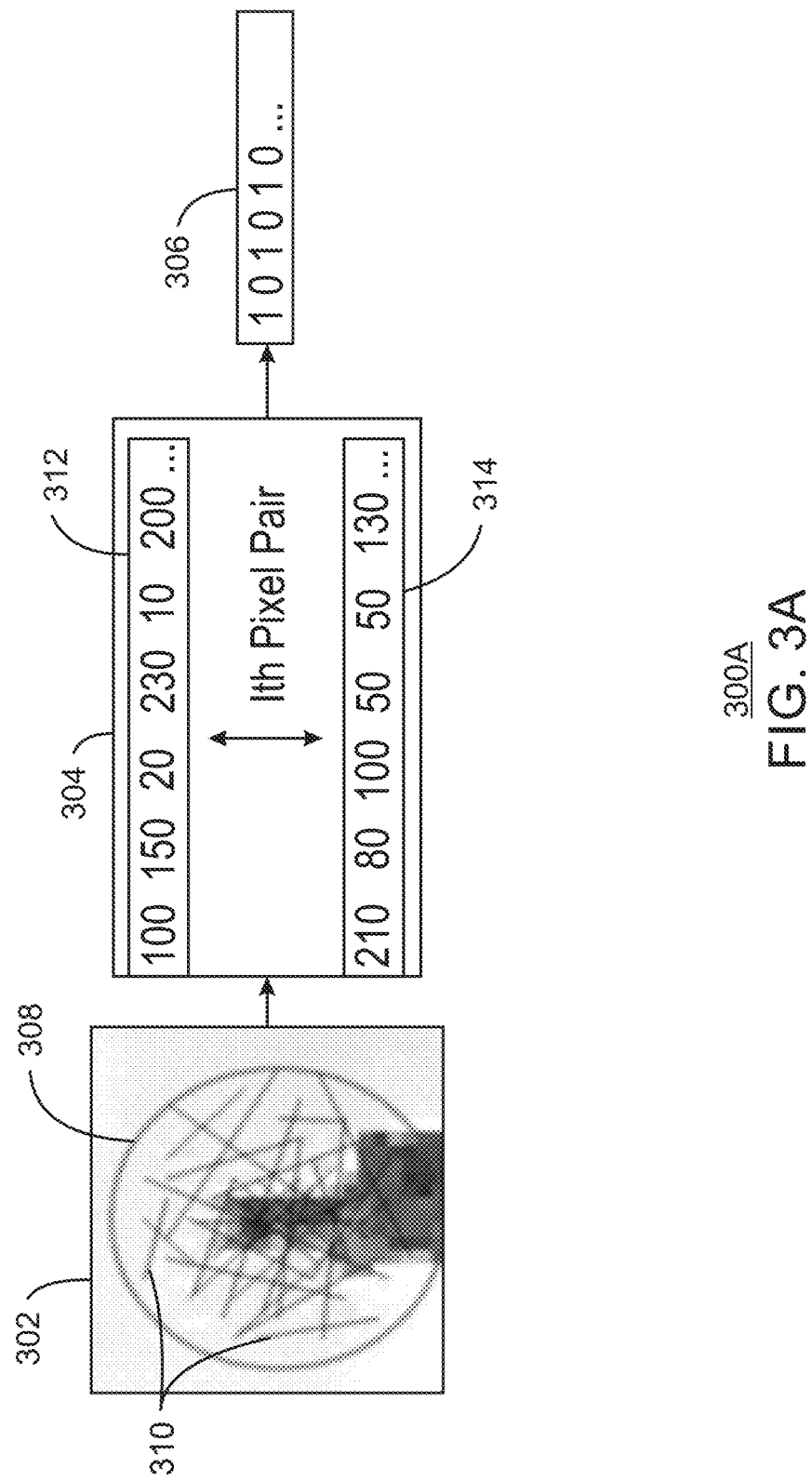
FIG. 3A is a diagram illustrating an example calculation of a binary descriptor.

FIG. 3A is a diagram illustrating an example calculation of a binary descriptor. The example binary descriptor calculation 300A can be implemented in the computing device 600. For example, the binary descriptor calculation 300 can be performed using the descriptor calculator 114 of the system 100 of FIG. 1, the descriptor calculator 638 of the computing device 600 of FIG. 6, or the processor 702 and descriptor calculator module 714 of the computer readable media 700 of FIG. 7.

The binary descriptor calculation 300A FIG. 3A includes blocks 302, 304, and 306. At block 302, a detected keypoint and an image patch 308 is selected around the detected keypoint. For example, the image patch 308 is a circle with the keypoint at the center. A number of pixel pairs 310 are generated as shown by lines connecting the pairs of pixels in the image patch 308. The location or the coordinates of pixels in each pair are specified as a part of the given binary descriptor method used.

At block 304, the pairs of pixel values represented as vectors 312 and 314 are compared. The vector 312 includes the first pixel from each of the pixel pairs. The first pixel from ith pair is represented as p1[i]. The vector 314 includes a second pixel from each of the pixel pairs. The second pixel from ith pair is represented as p2[i]. For example, each of the values in vector 312 can be compared with an associated value of a paired pixel in vector 314 using p1 [i] and p2[i].

At block 306, a binary descriptor is generated based on the comparison. For example, if the pixel value in vector 312 is less than the pixel value in vector 314, then the value is one. Otherwise, the value is zero. The resulting binary descriptor is a vector of bits, with each bit 0 or 1 coming from the comparison of pixel values in various pairs around the keypoint in the image patch 308. The resulting binary descriptor in FIG. 3 is 101010.

Figure 3B:
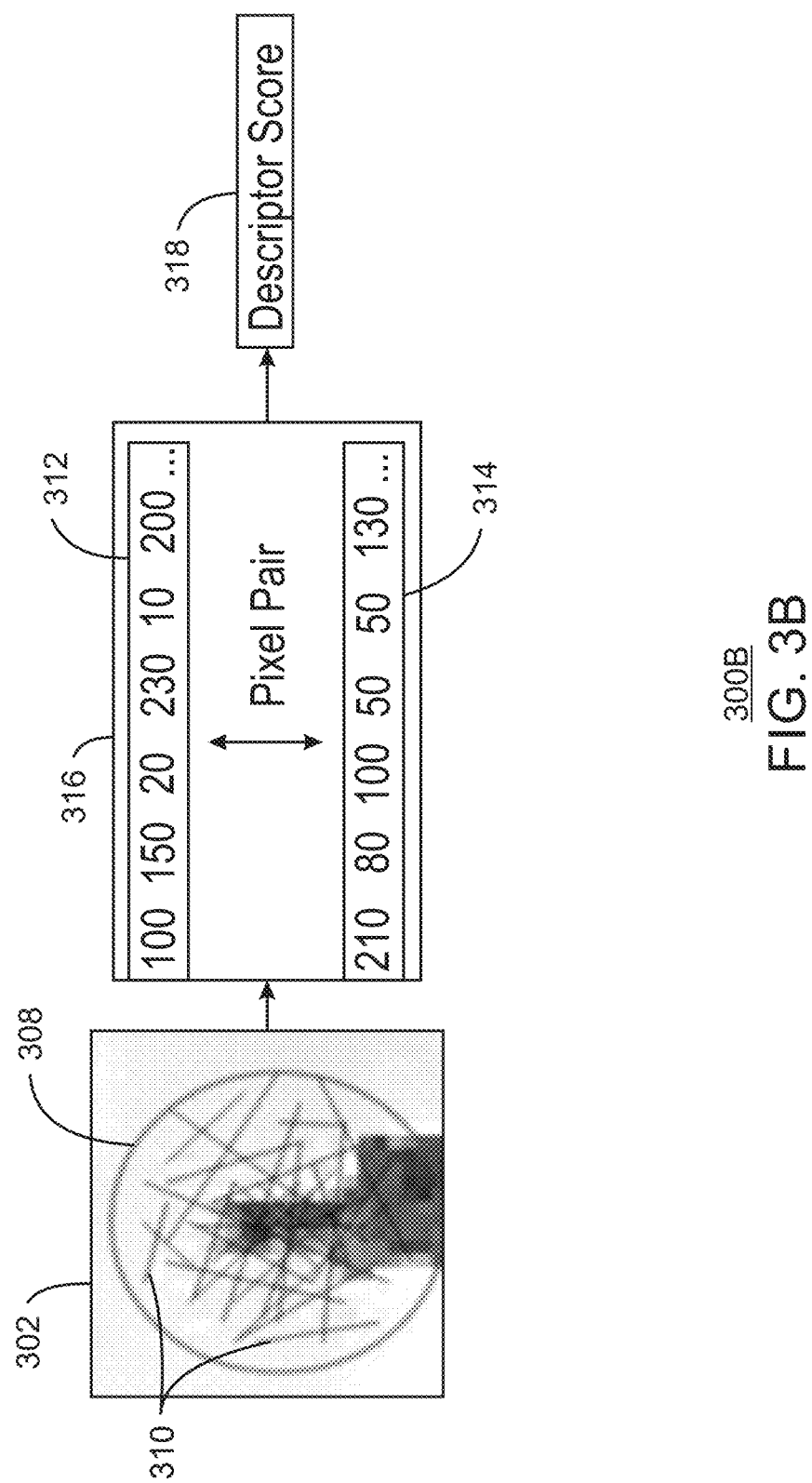
FIG. 3B is a diagram illustrating an example descriptor score calculation.

FIG. 3B is a diagram illustrating an example descriptor score calculation. The example descriptor score calculation 300B can be implemented in the computing device 600. For example, the descriptor score calculation 300B can be performed using the descriptor score calculator 106 of the system 100 of FIG. 1, the score calculator 634 of the computing device 600 of FIG. 6, or the processor 702 and score calculator module 710 of the computer readable media 700 of FIG. 7.

FIG. 3B includes similarly numbered elements from FIG. 3A. In addition, FIG. 3B includes a set of pixel pairs 316 on which a descriptor score 318 is calculated. In various examples, the descriptor score for binary descriptor can be calculated as follows. At block 316, the pairs of pixel values are represented as vectors 312 and 314. Each value in vector 312 can be subtracted from the associated value of a paired pixel in vector 314. The sum of absolute differences is accumulated for all pixel pairs and summed together to compute the descriptor score 318.

In various examples, if the image texture is distinct and strong, the relation between two random pixel values p1 and p2 in an image patch 308 is more tolerant to distortions. Strong structures around a keypoint may thus result in a strong descriptor. For example, given two patches, one with strong structure and another with weak structure, if the absolute differences |p1−p1'| and |p2−p2'| of pixel pairs p1, p1' and p2, p2' are large, then there the relation p1>p1' and p2>p2, will remain unchanged even under various distortions. Thus, the descriptor of patch with a strong texture, where the randomly calculated pixel pair values |p1−p1'| is high, is more likely to remain unchanged. In some examples, the descriptor score used to indicate strength of a particular descriptor at a keypoint may thus be the sum of the absolute differences for all 'n' pixel pairs used in descriptor calculation. High descriptor scores indicate that there is strong structure among pixels in an image patch. By contrast, a high detector score for a keypoint does not always mean there is strong structure around the keypoint. For example, an image patch may receive a high detector score because the corner of a blob in the image patch 308 is very distinct. The blob is a region of an image in which some properties, such as pixel intensity, are constant or approximately constant. However, the descriptor score for this patch may below because there is hardly any texture around the blob in the image patch 308.

The diagram of FIG. 3B is not intended to indicate that the example descriptor score calculation 300B is to include all of the components shown in FIG. 3B. Rather, the example descriptor score calculation 300B can be implemented using fewer or additional components not illustrated in FIG. 3B (e.g., additional keypoints, pixel pairs, descriptor scores, etc.).

Figure 3C:
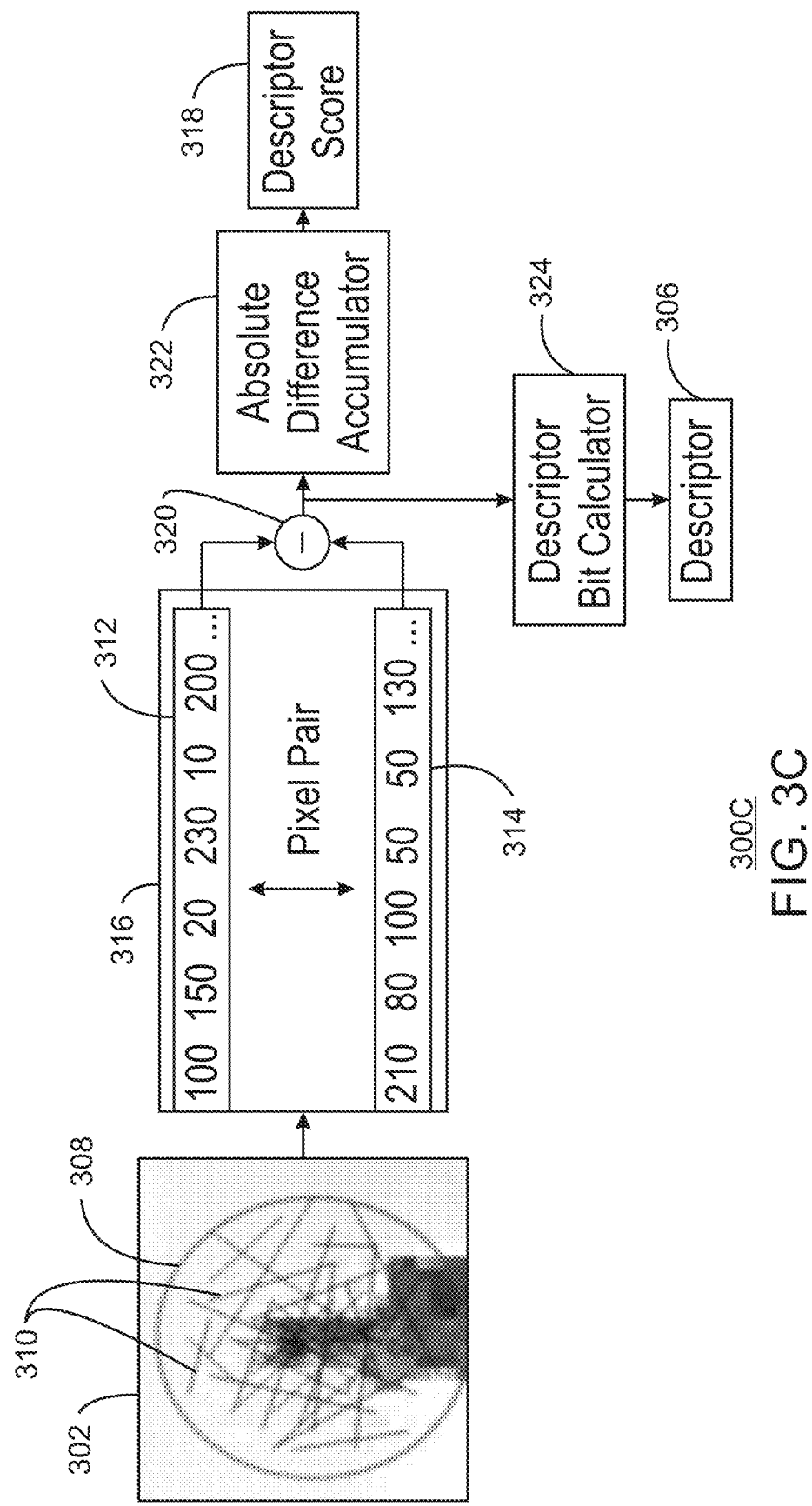
FIG. 3C is a diagram illustrating an example simultaneous descriptor and descriptor score calculation.

FIG. 3C is a diagram illustrating an example simultaneous descriptor and descriptor score calculation. The example descriptor score calculation 300C can be implemented in the computing device 600.

FIG. 3C shows a descriptor being calculated while calculating descriptor score. In particular, pairs of pixels p1 [i] 312 and p2[i] 314 are processed at a difference calculator 320. For example, the difference calculator 320 can calculate a difference of p2[i]–p1 [i] for each of the pixel pairs. An absolute difference accumulator 322 can then generate a descriptor score 318 based on the calculated differences. For example, the absolute difference accumulator 322 can calculate a descriptor score 318 based on a sum of absolute differences of the output differences from the difference calculator 320. A descriptor bit calculator 324 can calculate a descriptor 306 based on the calculated differences from the difference calculator 320. For example, the descriptor bit calculator 324 can generate a value of 1 if the difference of a pixel pair is greater than zero, or a value of zero if the difference of a pixel pair is less than zero. The resulting descriptor 306 may thus be simultaneously generated with the descriptor score 318. Calculating the descriptor while calculating the descriptor score can reduce computing overhead and thus improve efficiency of the computing device.

The diagram of FIG. 3C is not intended to indicate that the example simultaneous descriptor and descriptor score calculation 300C is to include all of the components shown in FIG. 3C. Rather, the example simultaneous descriptor and descriptor score calculation 300C can be implemented using fewer or additional components not illustrated in FIG. 3C (e.g., additional keypoints, pixel pairs, absolute difference accumulator, descriptor bit calculators, descriptor scores, descriptors, etc.).

Figure 4:
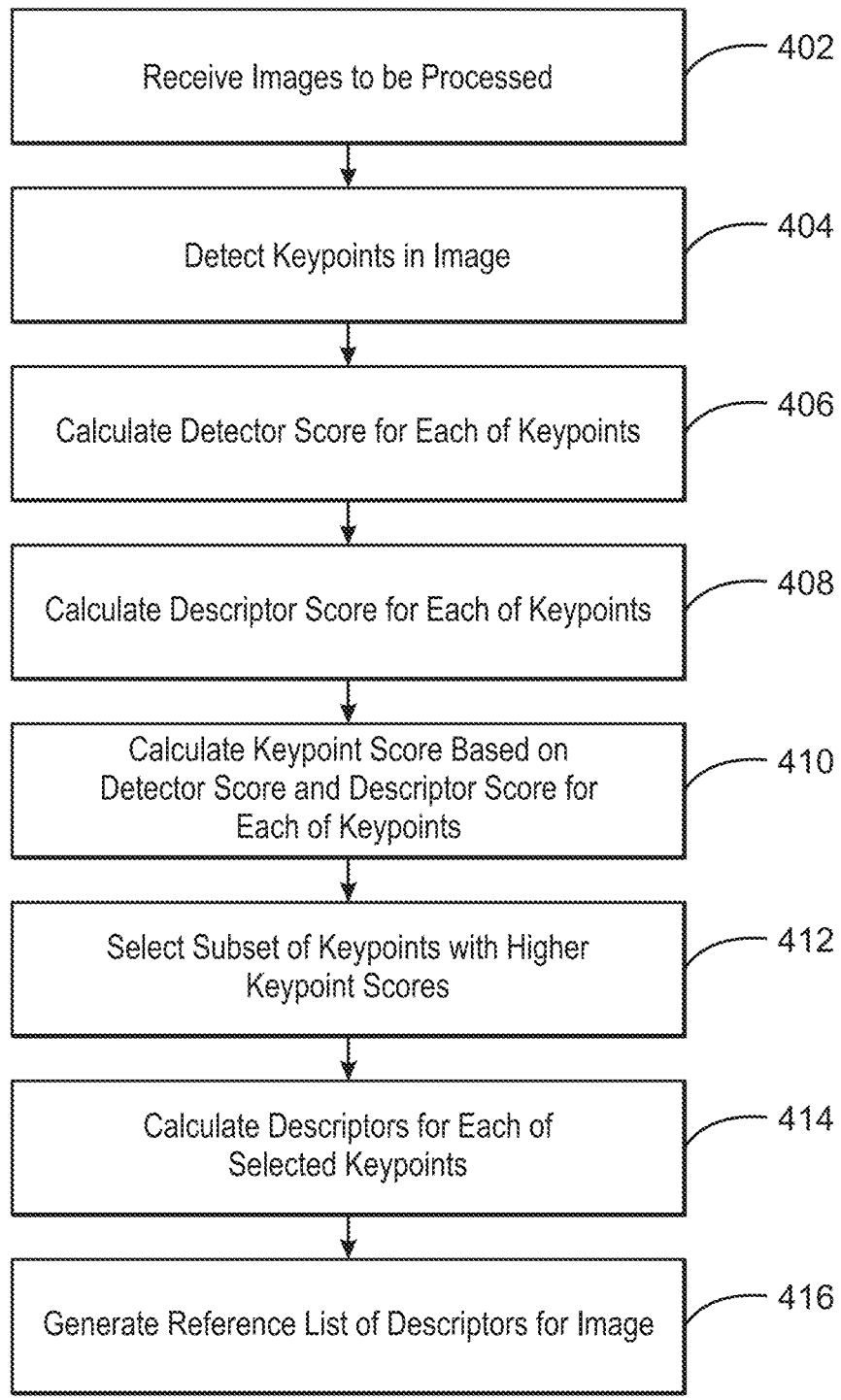
FIG. 4 is a process flow diagram illustrating a method for selecting keypoints using descriptor scores.

FIG. 4 is a process flow diagram illustrating a method for selecting keypoints using descriptor scores. The example method 400 can be implemented in the computer device 600 of FIG. 6 or the computer readable media 700 of FIG. 7.

At block 402, images to be processed are received. For example, the images can be subsequent frames of a video.

At block 404, keypoints in an image are detected. For example, the keypoints can be detected based on corners.

At block 406, a detector score for each of the keypoints is calculated. For example, the detector score may be a corner score calculated as described herein.

At block 408, a descriptor score for each of the keypoints is calculated. For example, the descriptor score can be a binary descriptor scores calculated using sum of absolute differences of values in pixel pairs used for calculating descriptors for a keypoint.

At block 410, a keypoint score based on the detector score and the descriptor score for each of the keypoints is calculated. For example, the overall the strength of keypoint can be calculated by using weighted combination of detector and descriptor scores. A weight (a) can be a tunable parameter to control how much relative importance to be given to detector score and descriptor score. In some examples, the calculation of the keypoint score can be used to incorporate multiple criteria for keypoint selection. For example, additional criteria can be added based on the application.

At block 412, a subset of keypoints with higher keypoint scores is selected. For example, the keypoints may be sorted using their strength based on the keypoint score and 'N' number of points selected for further processing. In various examples, the number of points selected N can be 50, 100, 150, 200, etc.

At block 414, descriptors for each of selected keypoints are calculated. In various examples, the descriptors are calculated using pixel pairs of an image patch associated with the keypoint.

At block 416, a reference list of descriptors for the image is generated. For example, the reference list may include a list of descriptors and associated keypoints.

This process flow diagram is not intended to indicate that the blocks of the example method 400 are to be executed in any particular order, or that all of the blocks are to be included in every case. Further, any number of additional blocks not shown may be included within the example method 400, depending on the details of the specific implementation.

Figure 5:
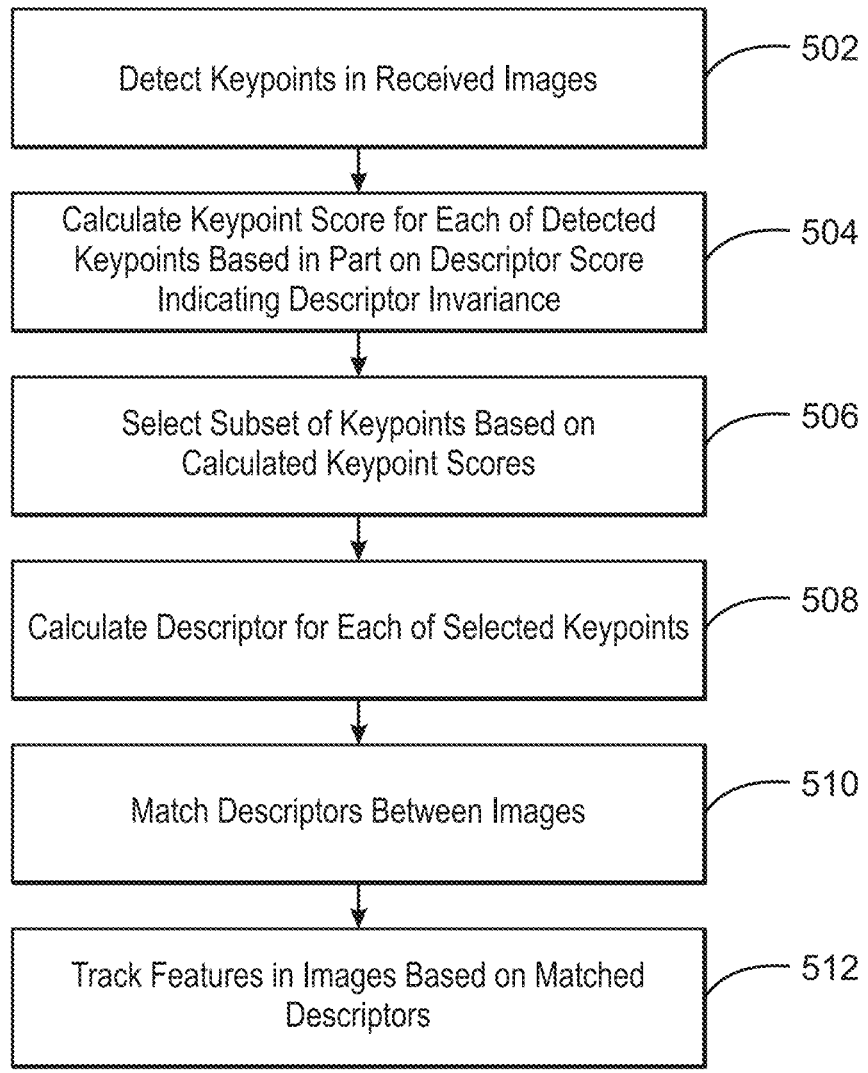
FIG. 5 is a process flow diagram illustrating another method for selecting keypoints using descriptor scores.

FIG. 5 is a process flow diagram illustrating another method for selecting keypoints using descriptor scores. The example method 500 can be implemented in the computer device 600 of FIG. 6 or the computer readable media 700 of FIG. 7.

At block 502, keypoints are detected in a number of received images. For example, the images can be subsequent frames of a video. For example, the keypoints can be detected based on corners.

At block 504, a keypoint score for each of the detected keypoints based in part on a descriptor score indicating invariance. In various examples, the descriptor score can be a binary descriptor scores calculated using sum of absolute differences of values in pixel pairs used for calculating descriptors for a keypoint. In some examples, the keypoint score is based on a detector score and the descriptor score. For example, the detector score indicating corner strength for each of the keypoints can be calculated. The descriptor score indicating invariance for each of the keypoints can also be calculated. The keypoint score is then calculated based on the detector score and the descriptor score for each of the keypoints. In some examples, a relative weight associated with the descriptor score and a detector score is adjusted via a tunable weight. In various examples, any number of criteria for keypoint selection is incorporated into the keypoint score. For example, additional scores can be calculated and the keypoint score calculated based on the additional scores.

At block 506, a subset of keypoints is selected based on the calculated keypoint scores. In various examples, a subset of the keypoints with calculated keypoint scores exceeding a threshold keypoint score are selected.

At block 508, descriptors are calculated for each of selected keypoints. In various examples, a histogram of gradients is generated for each of the keypoints. In various examples, binary descriptors are calculated based on intensity differences between intensity values of pixel pairs inside an image patch centered on the keypoint. In some examples, a reference list of descriptors for each of the plurality of images is generated.

At block 510, descriptors are matched between images in the number of received images. In various examples, a vector distance is calculated between the descriptors. A vector distance that is below a threshold distance is detected to match descriptors between two images. In some examples, a feature match may be performed for each of the selected keypoints in subsequently received images.

At block 512, features in the number of images are tracked based on the matched descriptors. In various examples, an object is tracked. In some examples, a visual odometry is performed. In other examples, simultaneous localization and mapping (SLAM) is performed. In some examples, a three-dimensional (3D) reconstruction is performed. In various examples, object recognition is performed. In some examples, image search and retrieval is performed. In various other examples, panorama creation or virtual view synthesis is performed.

This process flow diagram is not intended to indicate that the blocks of the example method 500 are to be executed in any particular order, or that all of the blocks are to be included in every case. Further, any number of additional blocks not shown may be included within the example method 500, depending on the details of the specific implementation. For example, any other types of visual tasks may be performed using the matched descriptors. In some examples, the descriptors are calculated as part of calculating the descriptor scores.

Figure 6:
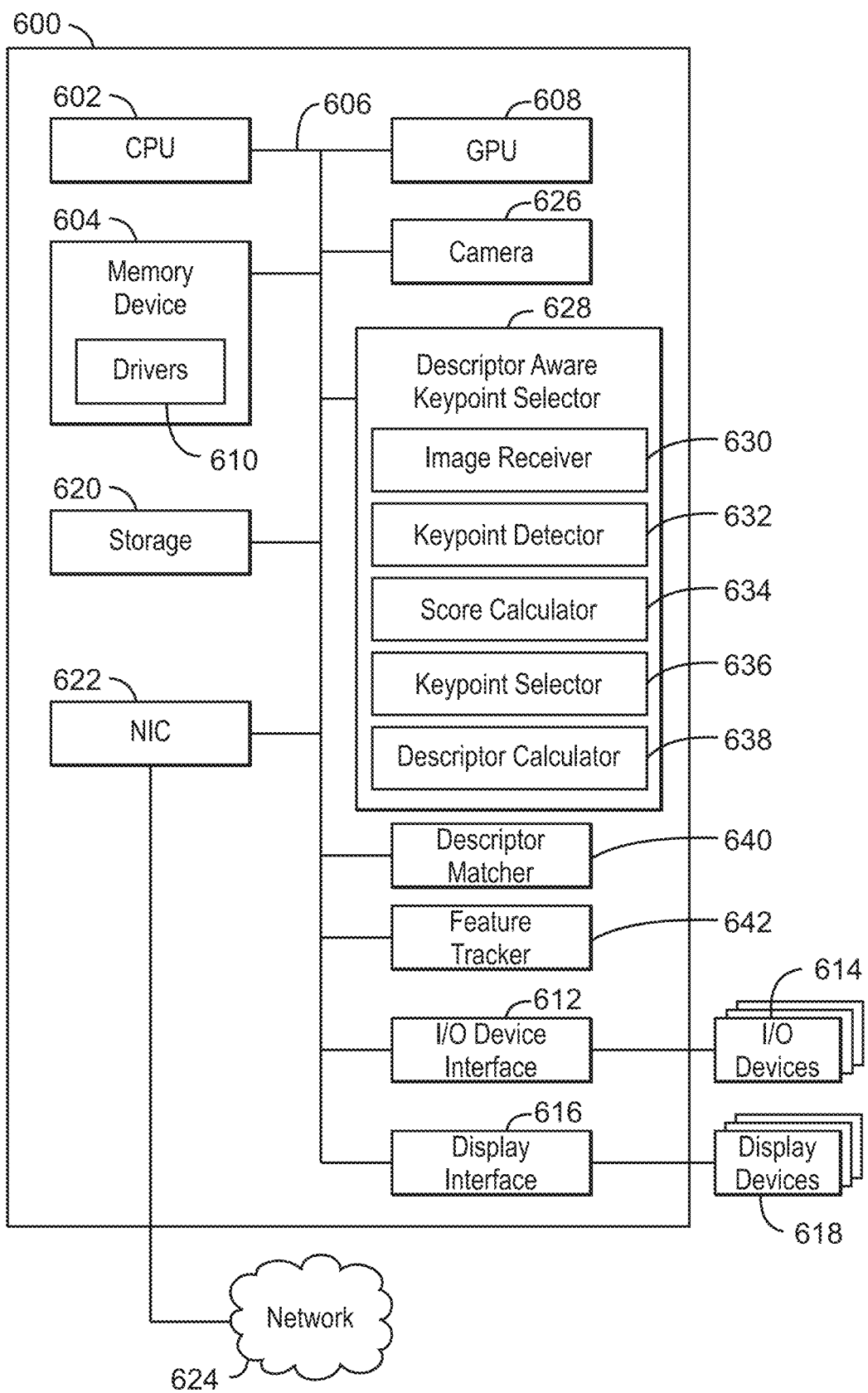
FIG. 6 is block diagram illustrating an example computing device that can select keypoints using descriptor scores.

Referring now to FIG. 6, a block diagram is shown illustrating an example computing device that can select keypoints using descriptor scores. The computing device 600 may be, for example, a laptop computer, desktop computer, tablet computer, mobile device, or wearable device, among others. In some examples, the computing device 600 may be a security camera or a robot. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing.

The memory device 604 can include random access memory (RAM), read only memory (ROM), flash memory, or any other suitable memory systems. For example, the memory device 604 may include dynamic random access memory (DRAM).

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 may include device drivers 610 that are configured to execute the instructions for generating reference list of descriptors for an image. The device drivers 610 may be software, an application program, application code, or the like.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600, or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 618. The display device 618 may include a display screen that is a built-in component of the computing device 600. The display device 618 may also include a computer monitor, television, or projector, among others, that is internal to or externally connected to the computing device 600.

The computing device 600 also includes a storage device 620. The storage device 620 is a physical memory such as a hard drive, an optical drive, a thumbdrive, an array of drives, a solid-state drive, or any combinations thereof. The storage device 620 may also include remote storage drives.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes a camera 626. For example, the camera may include one or more sensors. In some examples, the camera may be a color or infrared camera that can capture images to be processed using the techniques described herein.

The computing device 600 further includes a descriptor aware keypoint selector 628. For example, the descriptor aware keypoint selector 628 can be used to select keypoints using descriptor scores. The descriptor aware keypoint selector 628 can include an image receiver 630, a keypoint detector 632, a score calculator 634, a keypoint selector 636, a descriptor calculator 638, and a descriptor matcher 640. In some examples, each of the components 630-640 of the descriptor aware keypoint selector 628 may be a microcontroller, embedded processor, or software module. The image receiver 630 can receive images to be processed. The keypoint detector 632 can detect keypoints in a number of received images. In various examples, the keypoint detector 632 is a Harris corner detector, a Hessian detector, a Laplacian of Gaussian (LoG) detector, or a features from accelerated segment test (FAST) detector. The score calculator 634 can calculate a keypoint score for each of the detected keypoints based on a descriptor score indicating descriptor invariance. In various examples, the score calculator calculates a detector score indicating corner strength for each of the keypoints. In some examples, the score calculator 634 can then calculate a descriptor score indicating descriptor invariance for each of the keypoints. For example, the descriptor score for a keypoint can be a sum of squared differences or a sum of absolute differences for a plurality of pixel pairs used to calculate a descriptor for the keypoint. As one examples, the values of the pixels are intensity values. In some examples, the score calculator 634 can calculate the keypoint score based on the detector score and the descriptor score for each of the keypoints. For example, the score calculator 634 can include a tunable weight to adjust a relative weight associated with the descriptor score and a detector score. The keypoint selector 636 selects keypoints based on the calculated keypoint scores. In various examples, the keypoint selector 636 selects a subset of the keypoints with calculated keypoint scores exceeding a threshold keypoint score. The descriptor calculator 638 can calculate descriptors for each of the selected keypoints. In various examples, the descriptors are histogram of gradients descriptors. In some examples, the descriptors are binary descriptors. As one examples, the descriptors are calculated as part of a descriptor score calculations. The descriptor calculator 638 can generate a reference list of descriptors for the image.

A descriptor matcher 640 matches corresponding descriptors between images in the plurality of received images. For example, descriptor matcher 640 can calculate a vector distance between the descriptors. In some examples, the descriptor matcher 640 detects a vector distance that is below a threshold distance to match descriptors between two images. In some examples, descriptor matcher 640 can perform a feature match for each of the selected keypoints in subsequently received images.

A feature tracker 642 tracks a feature in the plurality of images based on the matched descriptors. For example, the feature tracker 642 may be included in a tracking application, such as an object tracker, a visual odometry application, a simultaneous localization and mapping (SLAM) application, a 3D reconstruction application, an object recognition application, an image search and retrieval application, a panorama creation application, or a virtual view synthesis application.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. For example, the computing device 600 can also include a descriptor bit calculator or an absolute difference accumulator as described in FIG. 3C. Furthermore, any of the functionalities of the keypoint detector 632, the score calculator 634, the keypoint selector 636, the descriptor calculator 638, and the descriptor matcher 640, may be partially, or entirely, implemented in hardware and/or in the processor 602. For example, the functionality may be implemented with an application specific integrated circuit, in logic implemented in the processor 602, or in any other device. In addition, any of the functionalities of the CPU 602 may be partially, or entirely, implemented in hardware and/or in a processor. For example, the functionality of the descriptor aware keypoint selector 628 may be implemented with an application specific integrated circuit, in logic implemented in a processor, in logic implemented in a specialized graphics processing unit such as the GPU 608, or in any other device.

Figure 7:
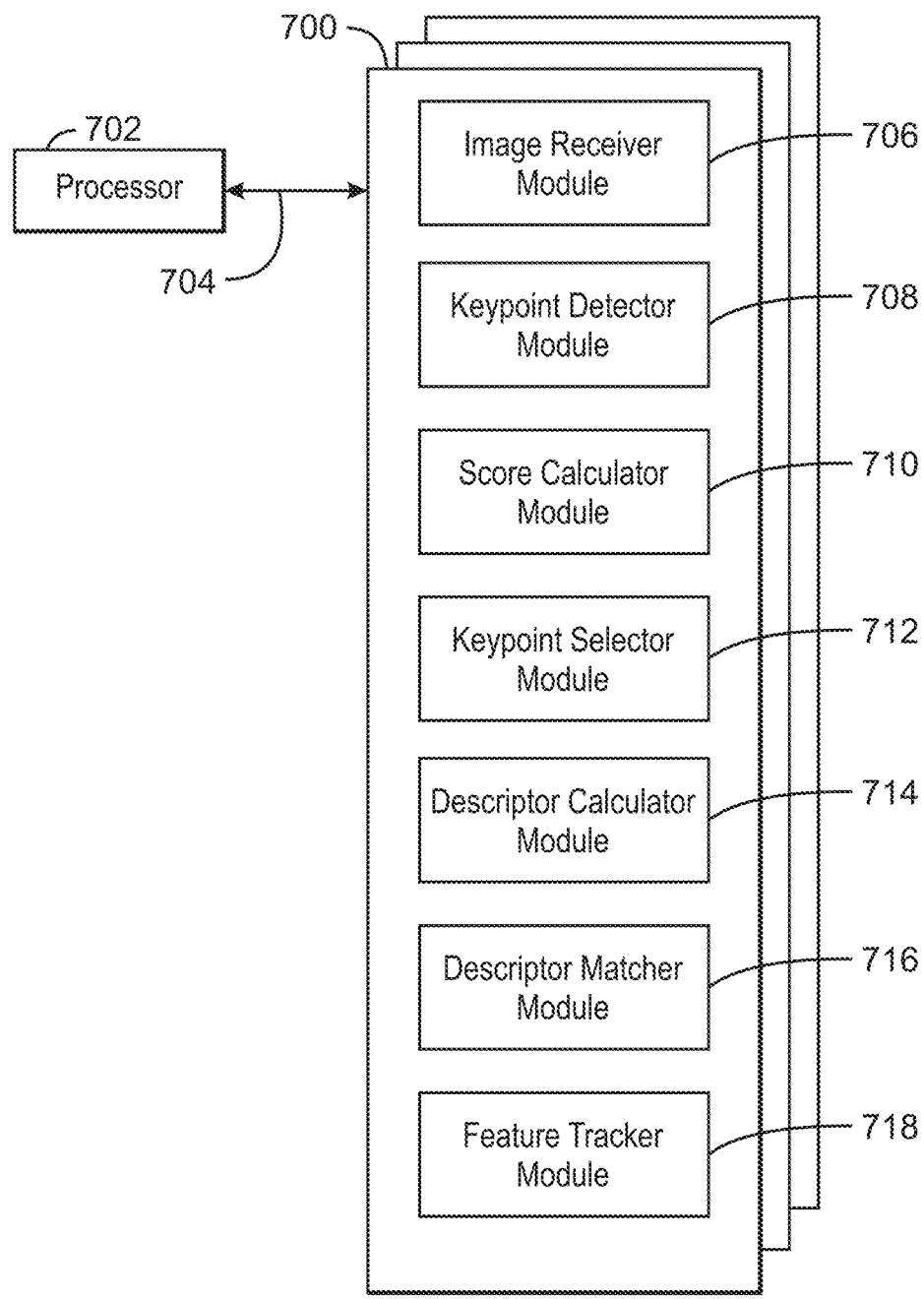
FIG. 7 is a block diagram showing computer readable media that store code for selecting keypoints using descriptor scores.

FIG. 7 is a block diagram showing computer readable media 700 that store code for selecting keypoints using descriptor scores. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media.

The various software components discussed herein may be stored on one or more computer readable media 700, as indicated in FIG. 7. For example, an image receiver module 706 may be configured to receive images to be processed. A keypoint detector module 708 is configured to detect keypoints in any number of images. A score calculator module 710 is configured to calculate a keypoint score for each of the detected keypoints based on a descriptor score indicating descriptor invariance. In various examples, the score calculator module 710 is configured to calculate a detector score for each of the keypoints. For example, the detector score can indicate corner strength for each of the keypoints. The score calculator module 710 may also be configured to calculate a descriptor score for each of the keypoints. For example, the descriptor score can descriptor invariance for each of the keypoints. In some examples, the score calculator module 710 may be configured to calculate the keypoint score based on the detector score and the descriptor score for each of the keypoints. In various examples, the score calculator module 710 is configured to calculate an additional score corresponding to an additional criteria and calculate the keypoint score based on the additional score. In some examples, the score calculator module 710 is configured to adjust a relative weight associated with the descriptor score and a detector score. A keypoint selector module 712 is configured to select keypoints based on the calculated keypoint scores. For example, the keypoint selector module 712 may be configured to select a subset of the keypoints with calculated keypoint scores exceeding a threshold keypoint score. A descriptor calculator module 714 may be configured to calculate descriptors for each of the selected keypoints. A descriptor matcher 716 module is configured to match corresponding descriptors between images in the plurality of received images. A feature tracker module 718 is configured to track a feature in the plurality of images based on the matched descriptors.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

EXAMPLES

Example 1 is an apparatus for selecting keypoints in images. The apparatus includes a keypoint detector to detect keypoints in a plurality of received images. The apparatus also includes a score calculator to calculate a keypoint score for each of the detected keypoints based on a descriptor score indicating descriptor invariance. The apparatus further includes a keypoint selector to select keypoints based on the calculated keypoint scores. The apparatus also further includes a descriptor calculator to calculate descriptors for each of the selected keypoints. The apparatus includes a descriptor matcher to match corresponding descriptors between images in the plurality of received images. The apparatus also includes a feature tracker to track a feature in the plurality of images based on the matched descriptors.

Example 2 includes the apparatus of example 1, including or excluding optional features. In this example, the score calculator is to calculate a detector score indicating corner strength for each of the keypoints. The score calculator is to also calculate the descriptor score indicating descriptor invariance for each of the keypoints. The score calculator is to further calculate the keypoint score based on the detector score and the descriptor score for each of the keypoints.

Example 3 includes the apparatus of any one of examples 1 to 2, including or excluding optional features. In this example, the descriptor score includes a sum of squared differences or a sum of absolute differences for a plurality of pixel pairs used to calculate a descriptor for each of the keypoints.

Example 4 includes the apparatus of any one of examples 1 to 3, including or excluding optional features. In this example, the score calculator includes a tunable weight to adjust a relative weight associated with the descriptor score and a detector score.

Example 5 includes the apparatus of any one of examples 1 to 4, including or excluding optional features. In this example, the keypoint selector is to select a subset of the keypoints with calculated keypoint scores exceeding a threshold keypoint score.

Example 6 includes the apparatus of any one of examples 1 to 5, including or excluding optional features. In this example, the descriptors include histogram of gradients descriptors.

Example 7 includes the apparatus of any one of examples 1 to 6, including or excluding optional features. In this example, the descriptors include binary descriptors.

Example 8 includes the apparatus of any one of examples 1 to 7, including or excluding optional features. In this example, the keypoint detector includes a Harris corner detector, a Hessian detector, a Laplacian of Gaussian (LoG) detector, or a features from accelerated segment test (FAST) detector.

Example 9 includes the apparatus of any one of examples 1 to 8, including or excluding optional features. In this example, the apparatus includes a reference descriptor list generator to generate a reference list of descriptors for each of the plurality of images.

Example 10 includes the apparatus of any one of examples 1 to 9, including or excluding optional features. In this example, the feature tracker includes an object tracking, visual odometry, simultaneous localization and mapping (SLAM), 3D reconstruction, object recognition, image search and retrieval, panorama creation, or virtual view synthesis application.

Example 11 is a method for selecting keypoints in images. The method includes detecting, via a processor, keypoints in a plurality of received images. The method also includes calculating, via the processor, a keypoint score for each of the detected keypoints based in part on a descriptor score indicating invariance. The method further includes selecting, via the processor, a subset of keypoints based on the calculated keypoint scores. The method also further includes calculating, via the processor, descriptors for each of selected keypoints. The method also includes matching, via the processor, descriptors between images in the plurality of received images. The method also further includes tracking, via the processor, a feature in the plurality of images based on the matched descriptors.

Example 12 includes the method of example 11, including or excluding optional features. In this example, calculating the keypoint score for each of the detected keypoints includes calculating a detector score indicating corner strength for each of the keypoints. Calculating the keypoint score for each of the detected keypoints also includes calculating the descriptor score indicating invariance for each of the keypoints. Calculating the keypoint score for each of the detected keypoints further includes calculating the keypoint score based on the detector score and the descriptor score for each of the keypoints.

Example 13 includes the method of any one of examples 11 to 12, including or excluding optional features. In this example, calculating the keypoint score includes calculating an additional score corresponding to an additional criteria and calculating the keypoint score based on the additional score.

Example 14 includes the method of any one of examples 11 to 13, including or excluding optional features. In this example, calculating the keypoint score includes adjusting a relative weight associated with the descriptor score and a detector score via a tunable weight.

Example 15 includes the method of any one of examples 11 to 14, including or excluding optional features. In this example, selecting the subset of keypoints includes selecting a subset of the keypoints with calculated keypoint scores exceeding a threshold keypoint score.

Example 16 includes the method of any one of examples 11 to 15, including or excluding optional features. In this example, calculating the descriptors includes generating a histogram of gradients for each of the keypoints.

Example 17 includes the method of any one of examples 11 to 16, including or excluding optional features. In this example, calculating the descriptors includes calculating binary descriptors based on intensity differences between intensity values of pixel pairs inside an image patch centered on each of the keypoints.

Example 18 includes the method of any one of examples 11 to 17, including or excluding optional features. In this example, matching the descriptors includes calculating a vector distance between the descriptors, and detecting that the vector distance is below a threshold distance.

Example 19 includes the method of any one of examples 11 to 18, including or excluding optional features. In this example, calculating the descriptors includes generating a reference list of descriptors for each of the received images.

Example 20 includes the method of any one of examples 11 to 19, including or excluding optional features. In this example, calculating the descriptors is part of calculating a descriptor score.

Example 21 is at least one computer readable medium for selecting keypoints in images having instructions stored therein that direct the processor to detect keypoints in a plurality of received images. The computer-readable medium also includes instructions that direct the processor to calculate a keypoint score for each of the detected keypoints based on a descriptor score indicating descriptor invariance. The computer-readable medium further includes instructions that direct the processor to select keypoints based on the calculated keypoint scores. The computer-readable medium also further includes instructions that direct the processor to calculate descriptors for each of the selected keypoints. The computer-readable medium also includes instructions that direct the processor to match corresponding descriptors between images in the plurality of received images. The computer-readable medium also further includes instructions that direct the processor to track a feature in the plurality of received images based on the matched corresponding descriptors.

Example 22 includes the computer-readable medium of example 21, including or excluding optional features. In this example, the computer-readable medium includes instructions to: calculate a detector score for each of the keypoints; calculate the descriptor score for each of the keypoints; and calculate the keypoint score based on the detector score and the descriptor score for each of the keypoints.

Example 23 includes the computer-readable medium of any one of examples 21 to 22, including or excluding optional features. In this example, the computer-readable medium includes instructions to calculate an additional score corresponding to an additional criteria and calculate the keypoint score based on the additional score.

Example 24 includes the computer-readable medium of any one of examples 21 to 23, including or excluding optional features. In this example, the computer-readable medium includes instructions to adjust a relative weight associated with the descriptor score and a detector score.

Example 25 includes the computer-readable medium of any one of examples 21 to 24, including or excluding optional features. In this example, the computer-readable medium includes instructions to select a subset of the keypoints with calculated keypoint scores exceeding a threshold keypoint score.

Example 26 includes the computer-readable medium of any one of examples 21 to 25, including or excluding optional features. In this example, the computer-readable medium includes instructions to generate a histogram of gradients for each of the keypoints.

Example 27 includes the computer-readable medium of any one of examples 21 to 26, including or excluding optional features. In this example, the computer-readable medium includes instructions to calculate binary descriptors based on intensity differences between intensity values of pixel pairs inside an image patch centered on each of the keypoints.

Example 28 includes the computer-readable medium of any one of examples 21 to 27, including or excluding optional features. In this example, the computer-readable medium includes instructions to calculate a vector distance between the descriptors, and detecting that the vector distance is below a threshold distance.

Example 29 includes the computer-readable medium of any one of examples 21 to 28, including or excluding optional features. In this example, the computer-readable medium includes instructions to generate a reference list of descriptors for each of the received images.

Example 30 includes the computer-readable medium of any one of examples 21 to 29, including or excluding optional features. In this example, the computer-readable medium includes instructions to calculate the descriptors as part of a descriptor score calculation.

Example 31 is a system for selecting keypoints in images. The system includes a keypoint detector to detect keypoints in a plurality of received images. The system also includes a score calculator to calculate a keypoint score for each of the detected keypoints based on a descriptor score indicating descriptor invariance. The system further includes a keypoint selector to select keypoints based on the calculated keypoint scores. The system also includes a descriptor calculator to calculate descriptors for each of the selected keypoints. The system further includes a descriptor matcher to match corresponding descriptors between images in the plurality of received images. The system also further includes a feature tracker to track a feature in the plurality of images based on the matched descriptors.

Example 32 includes the system of example 31, including or excluding optional features. In this example, the score calculator is to calculate a detector score indicating corner strength for each of the keypoints. The score calculator is to also calculate the descriptor score indicating descriptor invariance for each of the keypoints. The score calculator is to further and calculate the keypoint score based on the detector score and the descriptor score for each of the keypoints.

Example 33 includes the system of any one of examples 31 to 32, including or excluding optional features. In this example, the descriptor score includes a sum of squared differences or a sum of absolute differences for a plurality of pixel pairs used to calculate a descriptor for each of the keypoints.

Example 34 includes the system of any one of examples 31 to 33, including or excluding optional features. In this example, the score calculator includes a tunable weight to adjust a relative weight associated with the descriptor score and a detector score.

Example 35 includes the system of any one of examples 31 to 34, including or excluding optional features. In this example, the keypoint selector is to select a subset of the keypoints with calculated keypoint scores exceeding a threshold keypoint score.

Example 36 includes the system of any one of examples 31 to 35, including or excluding optional features. In this example, the descriptors include histogram of gradients descriptors.

Example 37 includes the system of any one of examples 31 to 36, including or excluding optional features. In this example, the descriptors include binary descriptors.

Example 38 includes the system of any one of examples 31 to 37, including or excluding optional features. In this example, the keypoint detector includes a Harris corner detector, a Hessian detector, a Laplacian of Gaussian (LoG) detector, or a features from accelerated segment test (FAST) detector.

Example 39 includes the system of any one of examples 31 to 38, including or excluding optional features. In this example, the system includes a reference descriptor list generator to generate a reference list of descriptors for each of the plurality of images.

Example 40 includes the system of any one of examples 31 to 39, including or excluding optional features. In this example, the feature tracker includes an object tracking, visual odometry, simultaneous localization and mapping (SLAM), 3D reconstruction, object recognition, image search and retrieval, panorama creation, or virtual view synthesis application.

Example 41 is a system for selecting keypoints in images. The system includes means for detecting keypoints in a plurality of received images. The system also includes means for calculating a keypoint score for each of the detected keypoints based on a descriptor score indicating descriptor invariance. The system includes means for selecting keypoints based on the calculated keypoint scores; means for calculating descriptors for each of the selected keypoints. The system further includes means for matching corresponding descriptors between images in the plurality of received images. The system also further includes means for tracking a feature in the plurality of images based on the matched descriptors.

Example 42 includes the system of example 41, including or excluding optional features. In this example, the means for calculating the keypoint score is to: calculate a detector score indicating corner strength for each of the keypoints; calculate the descriptor score indicating descriptor invariance for each of the keypoints; and calculate the keypoint score based on the detector score and the descriptor score for each of the keypoints.

Example 43 includes the system of any one of examples 41 to 42, including or excluding optional features. In this example, the descriptor score includes a sum of squared differences or a sum of absolute differences for a plurality of pixel pairs used to calculate a descriptor for each of the keypoints.

Example 44 includes the system of any one of examples 41 to 43, including or excluding optional features. In this example, the means for calculating the keypoint score includes a tunable weight to adjust a relative weight associated with the descriptor score and a detector score.

Example 45 includes the system of any one of examples 41 to 44, including or excluding optional features. In this example, the means for selecting the keypoints is to select a subset of the keypoints with calculated keypoint scores exceeding a threshold keypoint score.

Example 46 includes the system of any one of examples 41 to 45, including or excluding optional features. In this example, the descriptors include histogram of gradients descriptors.

Example 47 includes the system of any one of examples 41 to 46, including or excluding optional features. In this example, the descriptors include binary descriptors.

Example 48 includes the system of any one of examples 41 to 47, including or excluding optional features. In this example, the means for detecting the keypoints includes a Harris corner detector, a Hessian detector, a Laplacian of Gaussian (LoG) detector, or a features from accelerated segment test (FAST) detector.

Example 49 includes the system of any one of examples 41 to 48, including or excluding optional features. In this example, the system includes a reference descriptor list generator to generate a reference list of descriptors for each of the plurality of images.

Example 50 includes the system of any one of examples 41 to 49, including or excluding optional features. In this example, the feature tracker includes an object tracking, visual odometry, simultaneous localization and mapping (SLAM), 3D reconstruction, object recognition, image search and retrieval, panorama creation, or virtual view synthesis application.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described herein may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus implemented by at least one hardware processor comprising:
   keypoint detector circuitry to detect first keypoints in a plurality of images;
   score calculator circuitry to calculate a keypoint score for each of the detected first keypoints based on a weighted combination of a descriptor score and a detector score, the descriptor score indicating descriptor invariance, the detector score indicating magnitudes of gradients around the detected first keypoints;
   keypoint selector circuitry to select second keypoints from the first keypoints based on the calculated keypoint scores;
   descriptor calculator circuitry to calculate descriptors for each of the selected second keypoints;
   descriptor matcher circuitry to match corresponding descriptors between the plurality of the images; and
   feature tracker circuitry to track a feature in the plurality of the images based on the matched descriptors.

2. The apparatus of claim 1, wherein the score calculator circuitry is to:
   calculate the detector score indicating a corner strength for each of the first keypoints;
   calculate the descriptor score indicating descriptor invariance for each of the first keypoints; and
   calculate the keypoint score based on the detector score and the descriptor score for each of the first keypoints.

3. The apparatus of claim 1, wherein the descriptor score includes at least one of a sum of squared differences or a sum of absolute differences for a plurality of pixel pairs used to calculate the descriptors for each of the first keypoints.

4. The apparatus of claim 1, wherein the score calculator circuitry includes a tunable weight to adjust a relative weight associated with the weighted combination of the descriptor score and the detector score.

5. The apparatus of claim 1, wherein the second keypoints have calculated keypoint scores exceeding a threshold keypoint score.

6. The apparatus of claim 1, wherein the descriptors include histogram of gradients descriptors.

7. The apparatus of claim 1, wherein the descriptors include binary descriptors.

8. The apparatus of claim 1, wherein the keypoint detector circuitry includes at least one of a Harris corner detector, a Hessian detector, a Laplacian of Gaussian (LoG) detector, or a features from accelerated segment test (FAST) detector.

9. The apparatus of claim 1, further including reference descriptor list generator circuitry to generate a reference list of descriptors for each of the plurality of images.

10. The apparatus of claim 1, wherein the feature tracker circuitry includes at least one of an object tracking, visual odometry, simultaneous localization and mapping (SLAM), 3D reconstruction, object recognition, image search and retrieval, panorama creation, or virtual view synthesis application.

11. A method comprising:
   detecting, via a processor, first keypoints in a plurality of images;

calculating, via the processor, a keypoint score for each of the first keypoints based on a weighted combination of a descriptor score and a detector score, the descriptor score indicating descriptor invariance, the detector score indicating magnitudes of gradients around the detected first keypoints;

selecting, via the processor, second keypoints from the first keypoints based on the calculated keypoint scores;

calculating, via the processor, descriptors for each of selected second keypoints;

matching, via the processor, descriptors between in the plurality of the images; and tracking, via the processor, a feature in the plurality of the images based on the matched descriptors.

12. The method of claim 11, wherein calculating the keypoint score for each of the detected first keypoints includes:

calculating the detector score indicating a corner strength for each of the first keypoints;

calculating the descriptor score indicating invariance for each of the first keypoints; and calculating the keypoint score based on the detector score and the descriptor score for each of the first keypoints.

13. The method of claim 11, wherein calculating the keypoint score includes calculating an additional score corresponding to an additional criteria and calculating the keypoint score based on the additional score.

14. The method of claim 11, wherein calculating the keypoint score includes adjusting a relative weight associated with the descriptor score and a detector score via a tunable weight.

15. The method of claim 11, wherein the second keypoints have calculated keypoint scores exceeding a threshold keypoint score.

16. The method of claim 11, wherein calculating the descriptors includes generating a histogram of gradients for each of the second keypoints.

17. The method of claim 11, wherein calculating the descriptors includes calculating binary descriptors based on intensity differences between intensity values of pixel pairs inside an image patch centered on each of the second keypoints.

18. The method of claim 11, wherein matching the descriptors includes calculating a vector distance between the descriptors, and detecting that the vector distance is below a threshold distance.

19. The method of claim 11, wherein calculating the descriptors includes generating a reference list of descriptors for each of the images.

20. The method of claim 11, wherein calculating the descriptors is part of calculating the descriptor score.

21. At least one non-transitory computer readable medium having instructions stored therein that, in response to being executed on a computing device, cause the computing device to:

detect first keypoints in a plurality of images;

calculate a keypoint score for each of the first keypoints based on a weighted combination of a descriptor score and a detector score, the descriptor score indicating descriptor invariance, the detector score indicating magnitudes of gradients around the detected first keypoints;

select second keypoints from the first keypoints based on the calculated keypoint scores;

calculate descriptors for each of the second keypoints;

match corresponding descriptors between the plurality of the images; and track a feature in the plurality of the images based on the matched corresponding descriptors.

22. The at least one non-transitory computer readable medium of claim 21, including instructions that, when executed, cause the computing device to:

calculate a detector score for each of the first keypoints;

calculate the descriptor score for each of the first keypoints; and calculate the keypoint score based on the detector score and the descriptor score for each of the first keypoints.

23. The at least one non-transitory computer readable medium of claim 21 including instructions that, when executed, cause the computing device to calculate an additional score corresponding to an additional criteria and calculate the keypoint score based on the additional score.

24. The at least one non-transitory computer readable medium of claim 21, including instructions that, when executed, cause the computing device to adjust a relative weight associated with the weighted combination of the descriptor score and the detector score.

25. The at least one non-transitory computer readable medium of claim 21, wherein the second keypoints have the calculated keypoint scores exceeding a threshold keypoint score.

* * * * *